United States Patent [19]

Homan et al.

[11] 4,269,963

[45] May 26, 1981

[54] MERCAPTOORGANOPOLYSILOXANES AND CURABLE COMPOSITIONS INCLUDING SAME

[75] Inventors: Gary R. Homan; Chi-Long Lee, both of Midland, Mich.

[73] Assignee: Dow Corning Corporation, Midland, Mich.

[21] Appl. No.: 99,300

[22] Filed: Dec. 3, 1979

[51] Int. Cl.$^3$ ............................................. C08G 77/06
[52] U.S. Cl. .................................. 528/17; 260/18 S; 528/14; 528/15; 528/18; 528/19; 528/24; 528/30; 528/32; 528/33; 528/34; 556/427; 556/429; 556/466
[58] Field of Search ................. 260/18 S; 528/17, 18, 528/15, 19, 14, 24, 30, 32, 33, 34; 556/429, 427, 466

[56] References Cited

U.S. PATENT DOCUMENTS

| | | | |
|---|---|---|---|
| Re. 29,760 | 9/1978 | Brown et al. | 528/41 |
| 2,843,555 | 7/1958 | Berridge | 260/18 |
| 3,122,522 | 2/1964 | Brown et al. | 260/46.5 |
| 3,161,614 | 12/1964 | Brown et al. | 260/46.5 |
| 3,170,894 | 2/1965 | Brown et al. | 260/46.5 |
| 3,175,993 | 3/1965 | Weyenberg | 260/46.5 |
| 3,294,739 | 12/1966 | Weyenberg | 260/46.5 |
| 3,334,067 | 8/1967 | Weyenberg | 260/46.5 |
| 3,445,419 | 5/1969 | Vanderlinde | 260/37 |
| 3,816,282 | 6/1974 | Viventi | 204/159.13 |
| 3,873,499 | 3/1975 | Michael et al. | 204/159.13 |
| 4,039,504 | 8/1977 | Homan et al. | 260/37 SB |
| 4,064,027 | 12/1977 | Gant | 204/159.13 |
| 4,066,603 | 1/1978 | Homan et al. | 260/37 SB |
| 4,070,328 | 1/1978 | Homan et al. | 260/37 SB |
| 4,070,329 | 1/1978 | Homan et al. | 260/37 SB |

FOREIGN PATENT DOCUMENTS

2008426 of 0000 Fed. Rep. of Germany .

*Primary Examiner*—Melvyn I. Marquis
*Attorney, Agent, or Firm*—Roger H. Borrousch

[57] ABSTRACT

Sulfur-containing organosiloxanes are prepared and can be used in the preparation of storage stable compositions curable to elastomers at room temperature. The organopolysiloxanes are alkoxy functional siloxane polymers characterized by a non-oxygen containing linkage between alkoxysilyl groups and the siloxane polymer chain. The non-oxygen linkage contains sulfur.

11 Claims, No Drawings

MERCAPTOORGANOPOLYSILOXANES AND CURABLE COMPOSITIONS INCLUDING SAME

BACKGROUND OF THE INVENTION

1. Field of the Invention

This invention relates to novel sulfur-containing organopolysiloxanes, to compositions including such polymers and to siloxane elastomers containing sulfur.

2. Description of the Prior Art

Organopolysiloxanes in which the terminal silicon atoms have one or more alkoxy groups attached thereto are known in the art and are useful in the preparation of compositions which are capable of being cured at room temperature to produce rubbery siloxane materials. The preparation of organopolysiloxanes in which terminal silicon atoms have at least two alkoxy groups attached thereto may be prepared, for example, according to the procedure set forth in U.S. Pat. No. 3,161,614. The reference also discloses the preparation of curable compositions including such polymers and curing catalysts such as metal salts of carboxylic acids, titanium esters and amines. As another example, it is noted in U.S. Pat. No. 3,294,729 that mixtures of alkoxy substituted silanes with hydroxylated siloxanes and selected titanium compounds will cure to an elastomeric material upon exposure to atmospheric moisture. It is proposed in U.S. Pat. No. 3,161,614 that the alkoxyl groups of the silane react with the hydroxyl groups of the hydroxylated siloxane to produce alkoxy ended siloxanes which, in turn, are cured to elastomers upon exposure to atmospheric moisture by the action of the catalyst.

It is believed that one of the limiting factors on storage stability of room temperature curable mixtures of alkoxy endblocked siloxane polymers and catalysts is the limited stability of, e.g, methyldimethoxy and trimethoxy siloxy groups at the ends of siloxane polymers.

There exists a need in the art for alkoxy functional group-containing polysiloxanes that exhibit storage stability in the presence of curing catalysts.

SUMMARY OF THE INVENTION

According to the present invention, novel sulfurcontaining organopolysiloxanes are prepared and may be employed in the preparation of storage stable compositions curable to elastomers at room temperature and preferably only upon exposure to atmospheric moisture. The organopolysiloxanes prepared according to the invention are alkoxy functional siloxane polymers characterized by a non-oxygen containing linkage between alkoxysilyl groups and the siloxane polymer chain. As a result of this characteristic, compositions of the invention which include such polymers and curing catalysts should exhibit stability equal to or better than prior compositions including alkoxy functional polymers.

Organopolysiloxanes of the invention include di- and tri-alkoxy functional polymers and may be prepared by reacting, e.g., alkenyl endblocked polysiloxanes with alkoxy mercaptoalkyl silanes. Alternately, the polymers may be formed by reacting, e.g., mercaptoalkyl endblocked polysiloxanes with alkoxy alkenyl silanes. Such addition reactions are readily carried out in the presence of suitable catalytic conditons including use of metal salts of carboxylic acids.

Curable compositions of the invention may optionally include fillers, viscosity aids and crosslinking agents and provide sealants, caulking materials, electrical insulation and the like, which cure rapidly at room temperature to elastomeric materials with non-sticky surfaces. Preferably curable compositions are stable when packaged to exclude moisture in the form of water or water vapor, including atmospheric water vapor, but will cure spontaneously upon exposure to moisture.

DESCRIPTION OF THE INVENTION

This invention relates to novel sulfur-containing organopolysiloxanes consisting essentially of a combination of units selected from dimethylsiloxane units, trimethylsiloxane units, sulfur-containing siloxane units of the formula

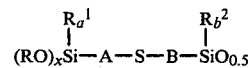

and pendent sulfur-containing siloxane units of the formula

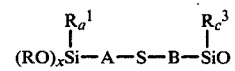

wherein:
R and $R^1$ are the same or different and selected from the group consisting of methyl and ethyl;
x has a value of 2 or 3;
a has a value of 0 or 1;
A and B are the same of different and selected from among the group consisting of divalent radicals of the formulas

and

wherein:
m and n are the same or different and have a value of from 2 to 4 inclusive, and trivalent radicals having the formula

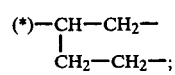

forming a silacyclopentamer by attachment of the (+) bond to a sulfur atom and the other two bonds to one silicon atom;
$R^2$ is a monovalent radical selected from the group consisting of alkyl and alkoxy radicals having from 1 to 3 carbon atoms inclusive and phenyl radical;
b has a value of 1 to 2;
$R^3$ is methyl or ethyl;
c has a value of 0 or 1;
provided that (1) in the divalent radical, no carbon atom is attached to both a silicon atom and a sulfur atom; (2) when A is a trivalent radical, x is 2 and a is 0; (3) when B is a trivalent radical, b is 1 and c is 0; and (4) when B is a divalent radical, b is 2 and c is 1; said organopolysiloxane containing an average of at least two sulfur-containing siloxane units per molecule and no more than 10 mole percent pendent sulfur-containing siloxane units based on the total number of siloxane units in the organopolysiloxane.

Organopolysiloxanes of the invention contain an average of at least about 2 sulfur-containing units per molecule and no more than 10 mole percent siloxane units having "pendent" alkoxy functional sulfur-containing groups based on the total number of siloxane units in the organopolysiloxane.

Curable compositions of the invention include:
(A) a sulfur-containing organopolysiloxane as described above;
(B) a curing catalyst in an amount equal to from 1 to 10 parts by weight per 100 parts by weight of (A);
(C) a filler in an amount of from 0 to 200 parts by weight per 100 parts by weight of (A); and
(D) a cross-linking agent, such as methyltrimethoxysilane, in an amount of from 0 to 10 parts by weight per 100 parts by weight of (A).

Examples of novel polymers of the invention having terminal, alkoxy functional sulfur-containing groups may be represented by the formulas I through VI:

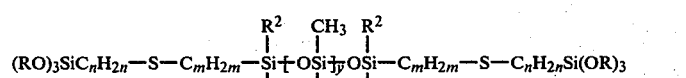

I

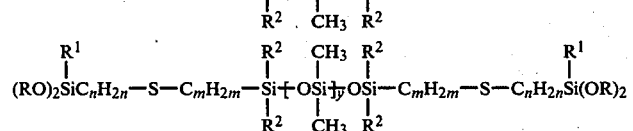

II

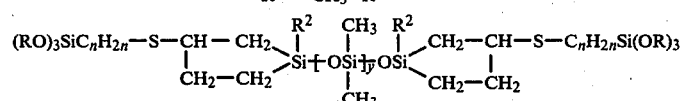

III

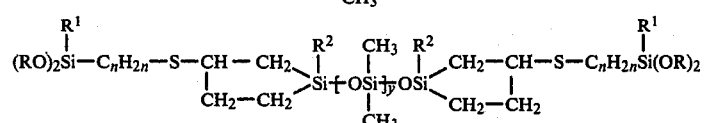

IV

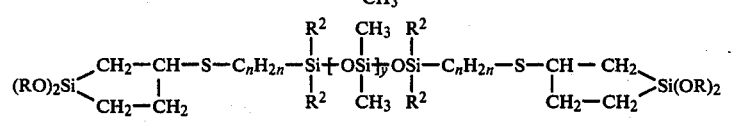

V

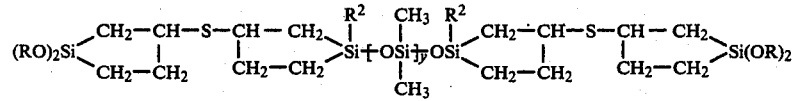

VI wherein:
R, $R^1$, $R^2$, m and n are defined above; and
y has a value of 0 to 1000 and preferably 200 to 800.

Those having "pendent" alkoxy functional, sulfur-containing groups may be represented by the formulas VII through XII:

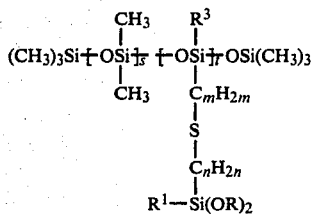

VII

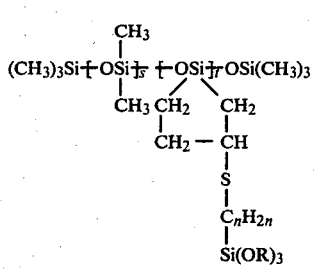

VIII

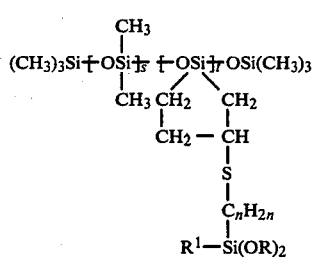

IX

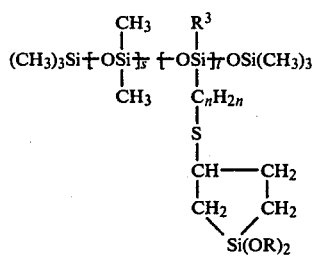

X

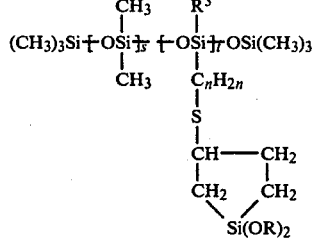

XI

-continued

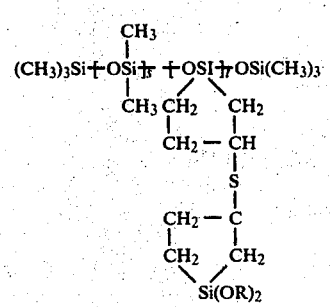

wherein:

R, $R^1$, $R^3$, m and n are defined above;

the sum of s and t has a value of 18 to 1000 and preferably 200 to 800; and t is greater than 2 and no more than a number providing 10 mole percent sulfur-containing siloxane units, based on total siloxane units in the organopolysiloxane.

Polymers of the invention are formed by an addition reaction between a mercapto-containing compound and alkenylcontaining compounds. The addition reaction is catalyzed by conventional means including electromagnetic and particulate radiation energy and, preferably, chemical catalysts such as metal salts of carboxylic acids. Polysiloxane reagent compounds for use in the synthesis of polymers of the invention include, for example, mercaptoorganopolysiloxanes and alkenyl-containing polysiloxanes such as are employed in the manufacture of cured compositions according to U.S. Pat. No. 4,039,504; U.S. Pat. No. 4,070,328; U.S. Pat. No. 4,070,329; U.S. Pat. No. 3,445,419; U.S. Pat. No. 3,816,282; U.S. Pat. No. 3,873,499; German Patent Publication (OLS) No. 2,008,426; U.S. Pat. No. 4,064,027; U.S. Pat. No. 4,066,603; and U.S. Patent Application Ser. No. 663,326, filed Mar. 3, 1976, by Gary N. Bokerman and Robert E. Kalinowski, entitled "Method of Curing Thick Section Elastomers".

Alkoxy mercaptoalkyl silane and alkoxy alkenyl silane reagent compounds for use in synthesis of polymers of the invention are easily prepared by methods well-known in the art.

As noted previously, the addition reactions involved in preparation of the polymers of the invention are readily carried out in the presence of suitable catalytic conditions such as ferric octoate. In some instances, it may be desirable to accelerate the catalytic activity of the metal salts with organic peroxides and hydroperoxides.

The novel polymers of the invention are useful in the preparation of curable compositions in essentially the same manner as prior art organopolysiloxanes having alkoxy groups attached thereto. As such, the curable compositions include the sulfur-containing organopolysiloxane, a curing catalyst, and, optionally, a filler, a viscosity aid, and/or a cross-linking agent.

The catalyst employed to cure the compositions of this invention can be any catalyst capable of causing the reaction of an alkoxysiloxane with water to form a hydroxysiloxane and further causing condensation between an SiOH group and a silicon-bonded alkoxy group or between SiOH groups. If desired, mutual solvents can be used to increase the solubility of the catalyst in the siloxane. One class of catalysts includes metal salts of monocarboxylic acids such as lead 2-ethylhexoate, dibutyltin diacetate, dibutyltin di-2-ethylhexoate, dibutyltin dilaurate, butyltin tri-2-ethylhexoate, iron 2-ethylhexoate, cobalt 2-ethylhexoate, manganese 2-ethylhexoate, zinc 2-ethylhexoate, stannous octoate, tin naphthenate, zirconium octoate, antimony octoate, bismuth naphthenate, tin oleate, tin butyrate, zinc naphthenate, zinc stearate and titanium naphthenate. The stannous carboxylates and certain orthotitanates and partial condensates thereof are preferred.

Another class of catalyst, which is particularly useful to prepare one package compositions, are titanium esters such as tetrabutyltitanate, tetra-2-ethylhexyltitanate, tetraphenyltitanate, tetraoctadecyltitanate, triethanolaminetitanate, octyleneglycoltitanate and bis-acetylacetonyldiisopropyltitanate.

Additional suitable catalysts include amines such as hexylamine, dodecylamine, and amine salts such as hexylamineacetate, dodecylaminephosphate and quaternary amine salts such as benzyltrimethylammoniumacetate and salts of alkali metals such as potassium acetate.

For the purpose of this invention the amount of catalyst is not critical but is normally present in amounts of from 1 to 10 parts by weight per 100 parts by weight of the siloxane.

Fillers can be used in the compositions of this invention, but are not required. The fillers can be both treated and untreated reinforcing fillers, such as fume silica and fume silica having triorganosiloxy groups such as trimethylsiloxy groups on the surface, carbon black or precipitated silica, and extending fillers such as crushed or ground quartz, diatomaceous earth, and calcium carbonate. The curable elastomeric compositions preferably contain filler up to about 200 parts by weight per 100 parts by weight mercaptoorganopolysiloxanes.

Cross-linking agents can be used in compositions of the invention but are not required. Such agents can include silanes of the formula $R^4_e Si(OR^5)_{4-e}$ wherein e has a value of from 0 to 2 inclusive and $R^4$ and $R^5$ can be, for example, mononuclear aryl, halogen-substituted mononuclear aryl, alkyl, alkenyl, alkynyl, haloalkyl, haloalkenyl, haloalkynyl, cycloalkyl, cycloalkenyl, and halogen substituted cycloalkyl and cycloalkenyl, and cyano lower alkyl.

Silanes of the above-noted formula are well known in the art and are described, for example, in U.S. Pat. No. 2,843,555. When such silanes are to have solely a cross-linking function, e has a value of 1 or less and the preferred silane is methyltrimethoxy silane. When it is desired that the silane additionally exhibit a potential for chain extension, e has a value of 2 and the preferred silane is dimethyldimethoxysilane.

In addition to use of the above-noted cross-linking agents, it is expected that materials functional as cross-linkers for curable compositions can be excess mercaptoorganotrialkoxysilane and species formed in situ during the preparation of the polymers of this invention. For example, use of a stoichiometric excess of mercaptoorganotrialkoxysilane and metal salt catalyst during formation of a polymer of the invention by condensation of the silane with an alkenylendblocked siloxane is expected to result in the polymers as described herein and in a suitable cross-linking agent of the formula,

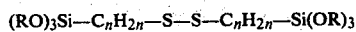

Compositions of this invention cure to elastomers at room temperature upon exposure to moisture in the form of water or water vapor, including atmospheric water vapor.

The following examples are presented for illustrative purposes and should not be construed as limiting the invention.

EXAMPLE 1

This example illustrates preparation of a novel trialkoxy endblocked polymer of the general formula I, and more specifically of the formula

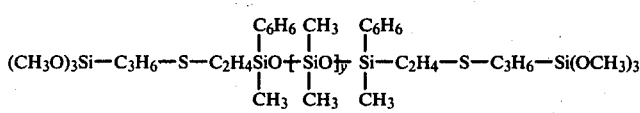

Five hundred grams of linear polydimethylsiloxane having terminal methylphenylvinylsiloxy units with a viscosity of about 2.625 Pa·s and approximately 0.25 weight percent vinyl radical was added to 18.15 g gamma-mercaptopropyltrimethoxysilane in a 1-liter, 3-necked flask and stirred to form a reaction mixture. One-half gram of a 52 weight percent dispersion of ferric octoate in mineral oil was added and the reaction mixture became orange in color. During the reaction, which was allowed to continue for two hours, the mixture became dark brown in color and a slight increase in temperature was noted. The volatiles were stripped off at 150° C. (at less than 1333 Pa pressure) to give a polymer which had a viscosity of 6.3 Pa·s. To a 5 g sample of the polymer, 0.07 g of tetrabutyltitanate was added. The mixture, exposed to the atmosphere at room temperature, formed a surface skin in 5 minutes and was thoroughly cured (0.5 to 1.0 cm thickness) upon standing overnight.

EXAMPLE 2

This example illustrates preparation of a novel trialkoxy endblocked polymer of the general formula I, and more specifically of the formula

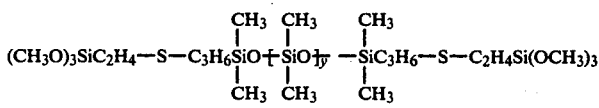

Five hundred grams of linear polydimethylsiloxane having terminal gamma-mercaptopropyldimethoxysiloxy units, with a viscosity of about 2.112 Pa·s and approximately 0.84 weight percent —SH group was added to 37 g of vinyltrimethoxysilane, catalyzed with 0.5 g of ferric octoate and allowed to react as in Example 1. The resulting polymer had a viscosity of about 10 Pa·s. A five gram sample catalyzed with 0.07 g of tetrabutyltitanate skinned over in five minutes and was completely cured upon standing overnight when exposed to the atmosphere at room temperature.

EXAMPLE 3

A polymer structurally similar to that of Example 1 was prepared by the method therein set forth but employing 100 g of a linear polydimethylsiloxane having terminal methylphenylvinylsiloxy units (viscosity, 8.968 Pa·s; 0.14 weight percent vinyl groups) and 20.4 g of gamma-mercaptopropyltrimethoxysilane. The mixture was allowed to react for five hours and yielded a polymer having a viscosity of 16.832 Pa·s. A 5 g sample of the polymer, exposed to the atmosphere at room temperature, skinned over in 5–10 minutes upon addition of 0.07 g tetrabutyltitanate. The sample cured open standing overnight at room temperature to give a low durometer composition.

EXAMPLE 4

This example illustrates preparation of a novel dialkoxy endblocked polymer of the general formula II and more specifically of the formula

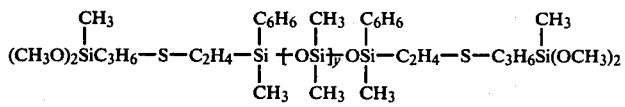

Five hundred grams of the linear polydimethylsiloxane employed in the synthesis of Example 1 was mixed with 16.65 g of (gammamercaptopropyl)methyldimethoxysilane and treated as in Example 1. The resulting polymer had a viscosity of 4.32 Pa·s. A 5 g sample of the polymer skinned over in about 45 minutes when catalyzed with 0.07 g tetrabutyltitanate and cured completely upon standing overnight exposed to the atmosphere at room temperature.

EXAMPLE 5

The synthesis of Example 3 was repeated using 500 g of the linear polydimethylsiloxane, 20.4 g of the silane and 1.0 g of the ferric octoate dispersion. The reaction was allowed to continue for 2.5 hours. A sample of the resulting polymer taken immediately after preparation did not exhibit substantial crosslinking upon catalysis with tetrabutyltitanate. After this polymer was allowed to shelf age for about three days, a 5 gram sample skinned over in 5 minutes upon addition of 0.07 g of the titanate and cured completely upon standing overnight at room temperature. The viscosity of the shelf aged polymer was 26.88 Pa·s and provided cured mixtures which display excellent adhesion characteristics to various surfaces including aluminum and steel.

EXAMPLE 6

The synthesis of Example 5 was repeated using 500 grams of the linear polydimethylsiloxane, 10.2 g of the silane and 0.5 g of the ferric octoate dispersion. After the reaction had proceeded for 45 minutes, 0.5 g of tertiarybutyl hydroperoxide was added with stirring and the reaction was continued for 75 minutes. The resulting polymer had a viscosity of 34.65 Pa·s. A 5 g sample of the polymer skinned over in 5 minutes upon catalysis with tetrabutyltitanate and completely cured upon standing overnight at room temperature.

EXAMPLE 7

The synthesis of Example 6 was repeated except that the peroxide was added initially, rather than after 45 minutes of reaction. The mixture was reacted for 1 hour. The viscosity of the polymer was 29.46 Pa·s and a sample displayed curing characteristics identical to those of the polymer of Example 6.

EXAMPLE 8

This example illustrates the preparation of a novel trialkoxy endblocked polymer of the general formula III, and more specifically of the formula

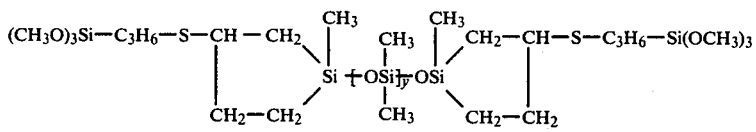

Five hundred grams of a linear polydimethylsiloxane having terminal methylsilacyclopentene units with a viscosity of 0.703 Pa·s and approximately 0.58 weight percent —CH=CH— was added to 44.0 g gamma-mercaptopropyltrimethoxysilane in a 1-liter flask. One-half gram of a 52 weight percent dispersion of ferric octoate in mineral oil was added along with 0.5 g tertiarylbutyl peroxide. Additional 0.5 g amounts of the peroxide were added to the reaction mixture after 1 and 24 hours of reaction, respectively. A 5 g sample taken after 25 hours of reaction and catalyzed with 0.07 g tetrabutyltitanate skinned over in 45 minutes and fully cured upon standing overnight exposed to the atmosphere at room temperature.

EXAMPLE 9

A curable composition was prepared from the following components:

| Component | Composition (Parts by Weight) |
| --- | --- |
| Polymer of Example 6 | 140 |
| Fume silica filler | 14 |
| Hydroxy endblocked polymethylphenylsiloxane having about 4 wt. % silicon-bonded hydroxyl | 4 |
| Methyltrimethoxysilane | 4 |
| Diisopropoxy titanium bis-(ethylacetoacetonate) | 2.8 |

The mixture was prepared by mixing under conditions which excluded moisture, and kept in a sealed tube. Samples from the tube were extruded into a molding chase, exposed to atmospheric air, and cured for five days at room temperature. The physical properties of the cured material were as follows:

| | |
| --- | --- |
| Durometer (Shore A) | 42 |
| Tensile Strength (MPa) | 2.83 |
| Elongation (%) | 250 |
| Tear Strength (kN/m) | 3.85 |
| Modulus (100%) (MPa) | 1.03 |
| Modulus (200%) (MPa) | 2.14 |

EXAMPLE 10

A curable composition was prepared from the components of Example 9, but using the polymer of Example 1.

The mixture was prepared by mixing under conditions which excluded moisture, and kept in a sealed tube. Samples from the tube were extruded into a molding chase, exposed to atmospheric air, and cured for five days at room temperature. The physical properties of the cured material were as follows:

| | |
| --- | --- |
| Durometer (Shore A) | 44 |
| Tensile Strength (MPa) | 2.21 |
| Elongation (%) | 160 |
| Tear Strength (kN/m) | 3.15 |
| Modulus (100%) (MPa) | 1.21 |

Numerous modifications and variations in the practice of the invention are expected to occur to those skilled in the art upon consideration of the foregoing description and only such limitations as appear in the appended claims should be placed thereon.

What is claimed is:

1. An organopolysiloxane consisting essentially of a combination of units selected from dimenthylsiloxane units, trimethylsiloxane units, sulfur-containing siloxane units of the formula

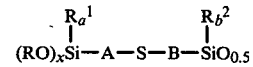

and pendent sulfur-containing siloxane units of the formula

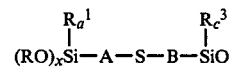

wherein:
R and $R^1$ are the same or different and selected from the group consisting of methyl and ethyl;
x has a value of 2 or 3;
a has a value of 0 or 1;
A and B are the same or different and selected from among the group consisting of divalent radicals of the formulas

and

wherein:
m and n are the same or different and have a value of from 2 to 4 inclusive, and trivalent radicals having the formula

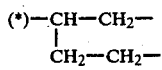

forming a silacyclopentamer by attachment of the (+) bond to a sulfur atom and the other two bonds to one silicon atom;

$R^2$ is a monovalent radical selected from the group consisting of alkyl and alkoxy radicals having from 1 to 3 carbon atoms inclusive and phenyl radical;

b has a value of 1 or 2;

$R^3$ is methyl or ethyl;

c has a value of 0 or 1;

provided that (1) in the divalent radical, no carbon atom is attached to both a silicon atom and a sulfur atom; (2) when A is a trivalent radical, x is 2 and a is 0; (3) when B is a trivalent radical, b is 1 and c is 0 and (4) when B is a divalent radical, b is 2 and c is 1; said organopolysiloxane containing an average of at least two sulfur-containing siloxane units per molecule and no more than 10 mole percent pendent sulfur-containing siloxane units based on the total number of siloxane units present in the organopolysiloxane.

2. The organopolysiloxane according to claim 1 and selected from among those represented by the formulas

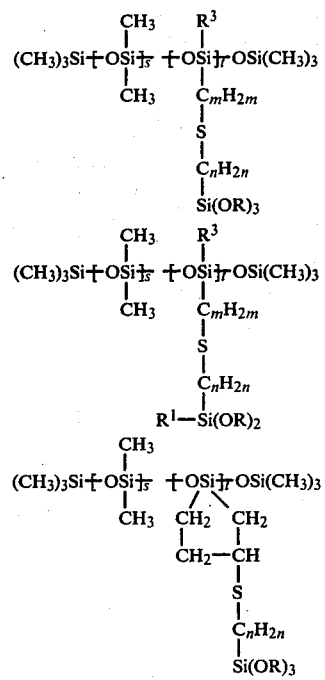

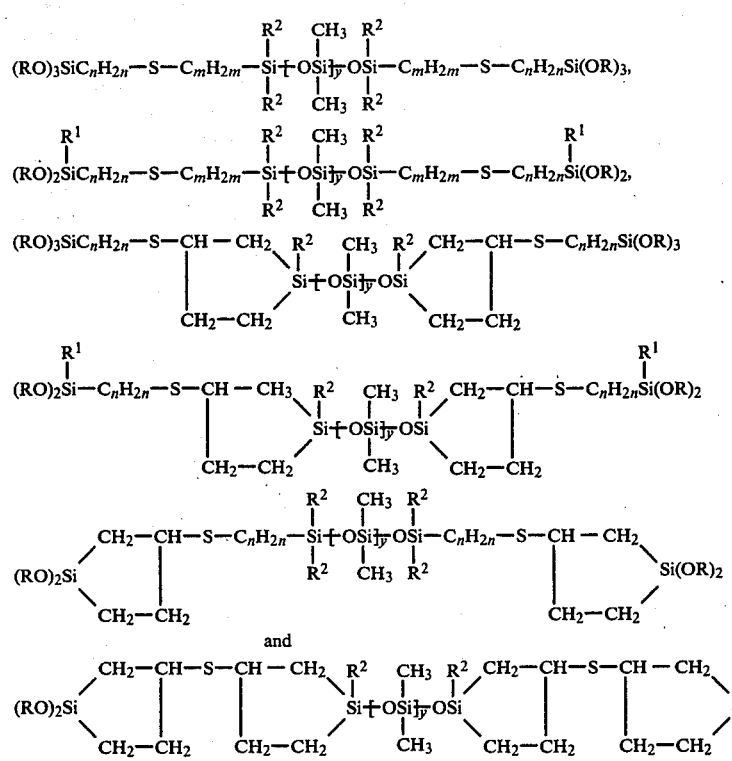

wherein: y has a value of 0 to 1000.

3. The organopolysiloxane according to claim 2 wherein y has a value of from about 200 to about 800.

4. The organopolysiloxane according to claim 1 and selected from among those represented by the formulas,

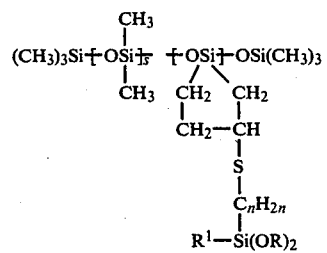

-continued

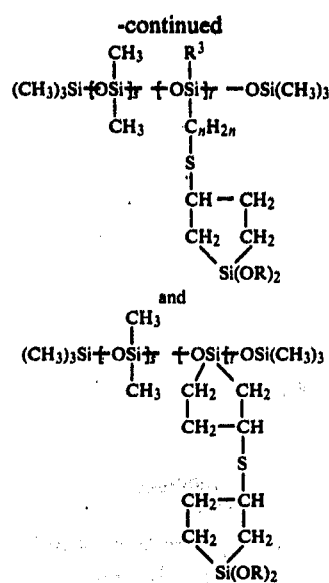

and

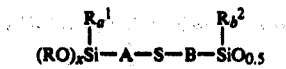

wherein:
  the sum of s and t has a value of 18 to 1000; and
  t is greater than 2 and no more than a number providing 10 mole percent sulfur-containing siloxane units, based on total siloxane units in the organopolysiloxane.

5. The organopolysiloxane according to claim 4 wherein the sum of s and t has a value of from about 200 to about 800.

6. A composition of matter comprising a material prepared by mixing
  (A) an organopolysiloxane consisting essentially of a combination of units selected from dimethylsiloxane units, trimethylsiloxane units, sulfur-containing siloxane units of the formula

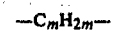

and pendent sulfur-containing siloxane units of the formula

wherein:
  R and $R^1$ are the same or different and selected from the group consisting of methyl and ethyl;
  x has a value of 2 or 3;
  a has a value of 0 or 1;
  A and B are the same or different and selected from among the group consisting of divalent radicals of the formulas $-C_mH_{2m}-$ and $-C_nH_{2n}-$ wherein: m and n are the same or different and have a value of from 2 to 4 inclusive, and trivalent radicals having the formula

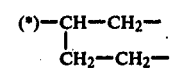

forming a silacyclopentamer by attachment of the (+) bond to a sulfur atom and the other two bonds to one silicon atom;
  $R^2$ is a monovalent radical selected from the group consisting of alkyl and alkoxy radicals having from 1 to 3 carbon atoms inclusive and phenyl radical;
  b has a value of 1 or 2;
  $R^3$ is methyl or ethyl;
  c has a value of 0 or 1;
  provided that (1) in the divalent radical, no carbon atom is attached to both a silicon atom and a sulfur atom; (2) when A is a trivalent radical, x is 2 and a is 0; (3) when B is a trivalent radical, b is 1 and c is 0; and (4) when B is a divalent radical, b is 2 and c is 1; said organopolysiloxane containing an average of at least two sulfur-containing siloxane units per molecule and no more than 10 mole percent pendent sulfur-containing siloxane units based on the total number of siloxane units present in the organopolysiloxane;
  (B) a curing catalyst in an amount equal to from about 1 to about 10 parts by weight per 100 parts by weight of (A);
  (C) a filler in an amount of from about 0 to about 200 parts by weight per 100 parts by weight of (A); and
  (D) a cross-linking agent in an amount of from 0 to 10 parts by weight per 100 parts by weight of (A).

7. The composition according to claim 6 wherein (A) is an organopolysiloxane selected from among those represented by the formulas

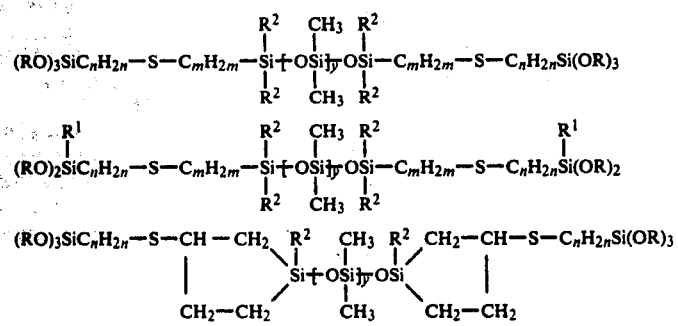

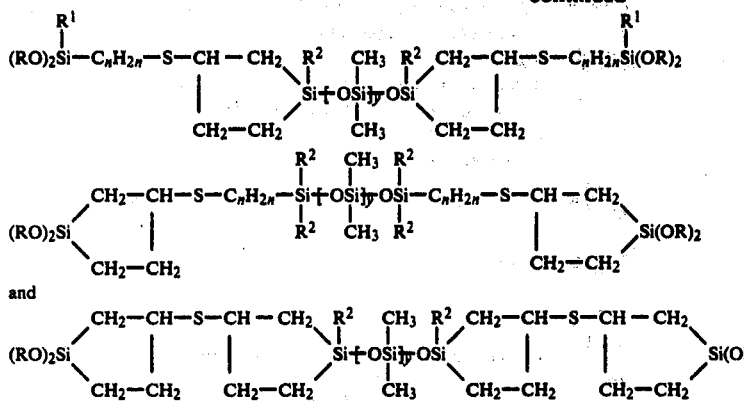
and

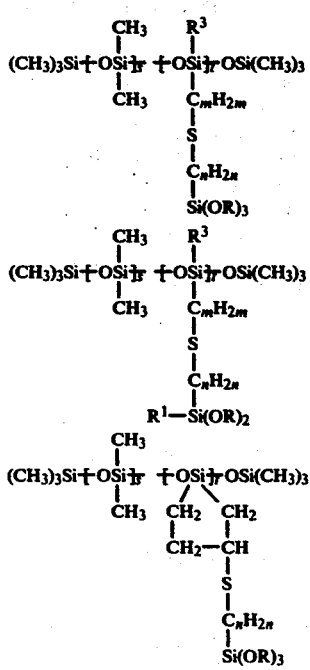

wherein: y has a value of 0 to 1000.

8. The composition according to claim 7 wherein y has a value of from about 200 to about 800.

9. The composition according to claim 6 wherein (A) is an organopolysiloxane selected from among those represented by the formulas,

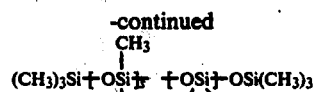

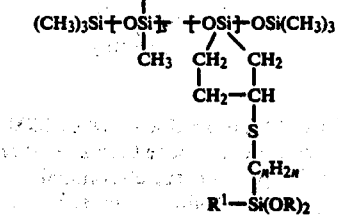

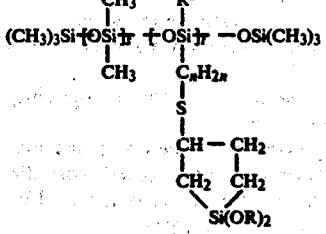

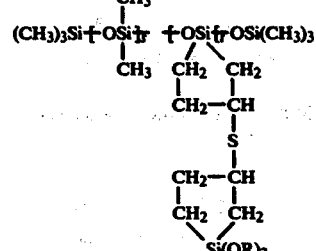

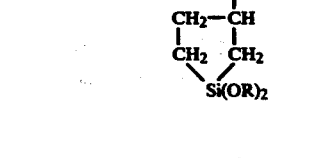

and

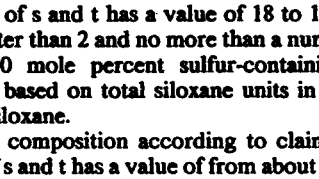

wherein:
the sum of s and t has a value of 18 to 1000; and
t is greater than 2 and no more than a number providing 10 mole percent sulfur-containing siloxane units, based on total siloxane units in the organopolysiloxane.

10. The composition according to claim 9 wherein the sum of s and t has a value of from about 200 to about 800.

11. The composition of matter in accordance with claim 6 in which the curing catalyst of (B) is a titanium ester and the composition is stable when packaged to exclude moisture but will cure spontaneously upon exposure to moisture.

* * * * *

UNITED STATES PATENT AND TRADEMARK OFFICE
CERTIFICATE OF CORRECTION

PATENT NO. : 4,269,963
DATED : May 26, 1981
INVENTOR(S) : Gary R. Homan and Chi-long Lee It is certified that error appears in the above—identified patent and that said Letters Patent is hereby corrected as shown below:

Column 1, line 43 - the term "sulfurcon-" should read "sulfur-con-"

Column 6, line 61 - the term "alkenylendblocked" should read "alkenyl-endblocked"

Column 11 - the formula reading

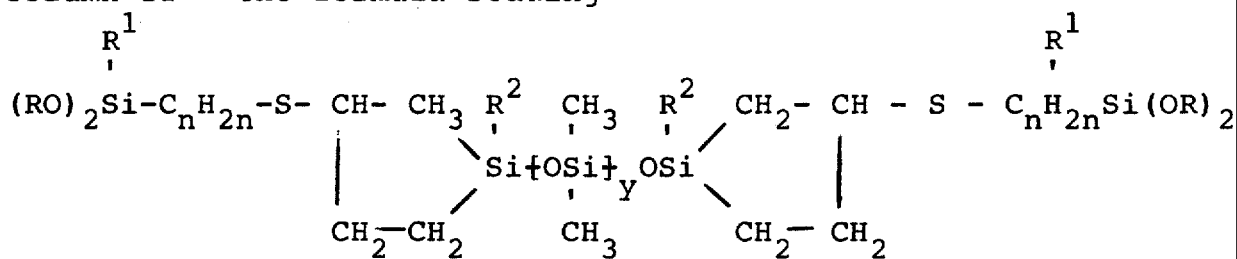

should read

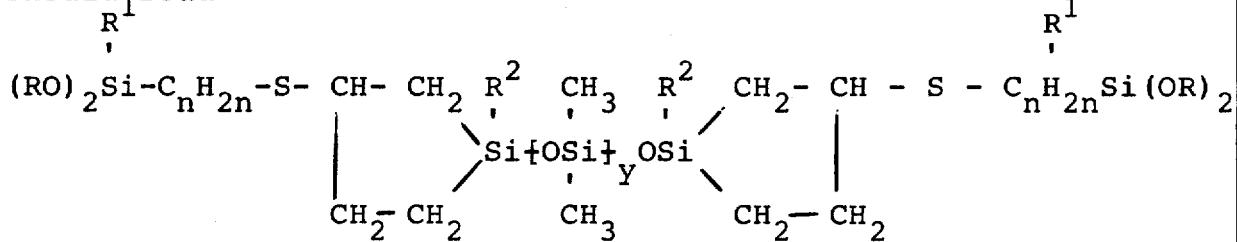

UNITED STATES PATENT AND TRADEMARK OFFICE
CERTIFICATE OF CORRECTION

PATENT NO. : 4,269,963

DATED : May 26, 1981

INVENTOR(S) : Gary R. Homan and Chi-long Lee

It is certified that error appears in the above—identified patent and that said Letters Patent is hereby corrected as shown below:

Column 12 - the formula

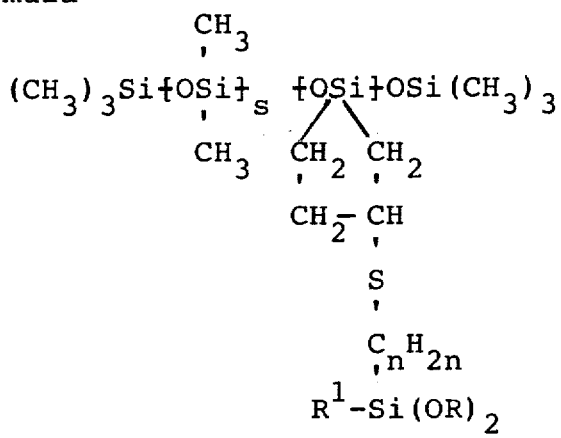

should read

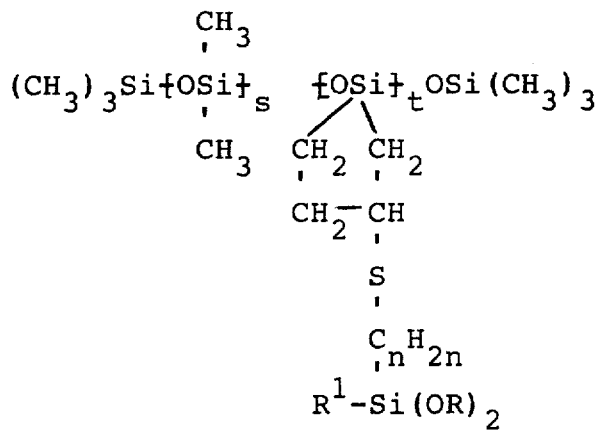

UNITED STATES PATENT AND TRADEMARK OFFICE
CERTIFICATE OF CORRECTION

PATENT NO. : 4,269,963  
DATED : May 26, 1981  
INVENTOR(S) : Gary R. Homan and Chi-long Lee It is certified that error appears in the above-identified patent and that said Letters Patent is hereby corrected as shown below:

Column 16 - the formula

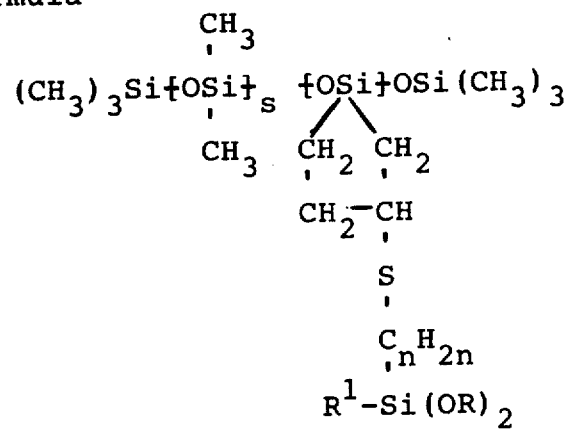

should read

UNITED STATES PATENT AND TRADEMARK OFFICE
CERTIFICATE OF CORRECTION

PATENT NO. : 4,269,963

DATED : May 26, 1981

INVENTOR(S) : Gary R. Homan and Chi-long Lee

It is certified that error appears in the above-identified patent and that said Letters Patent is hereby corrected as shown below:

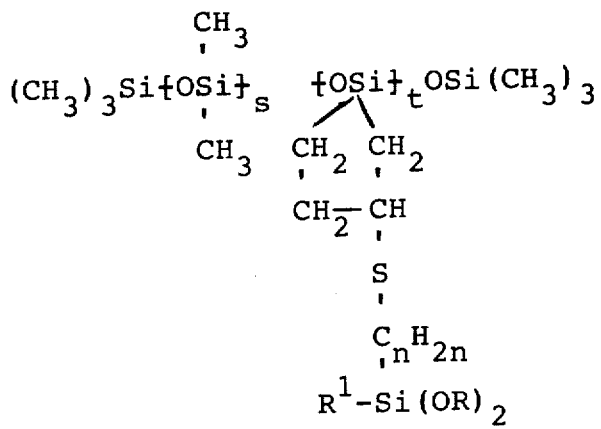

Signed and Sealed this

Ninth Day of November 1982

[SEAL]

Attest:

GERALD J. MOSSINGHOFF

Attesting Officer

Commissioner of Patents and Trademarks